(12) United States Patent
Mulligan

(10) Patent No.: US 8,915,656 B2
(45) Date of Patent: Dec. 23, 2014

(54) TAPER-LOCKING FERRULE

(75) Inventor: Paul M. Mulligan, Yorkville, IL (US)

(73) Assignee: Fiberfin, Inc., Yorkville, IL (US)

( * ) Notice: Subject to any disclaimer, the term of this patent is extended or adjusted under 35 U.S.C. 154(b) by 174 days.

(21) Appl. No.: 13/550,808

(22) Filed: Jul. 17, 2012

(65) Prior Publication Data

US 2014/0023325 A1 Jan. 23, 2014

(51) Int. Cl.
*G02B 6/36* (2006.01)

(52) U.S. Cl.
USPC .............................................. 385/78; 385/92

(58) Field of Classification Search
USPC ......................................... 385/53, 78, 90, 92
See application file for complete search history.

(56) References Cited

U.S. PATENT DOCUMENTS

| | | | | |
|---|---|---|---|---|
| 4,802,728 | A * | 2/1989 | Komatsu | 385/78 |
| 5,692,090 | A * | 11/1997 | Szegda | 385/139 |
| 6,848,834 | B1 * | 2/2005 | Roehrs et al. | 385/59 |
| 7,585,116 | B2 * | 9/2009 | Cull et al. | 385/60 |
| 2006/0088250 | A1 * | 4/2006 | Pimpinella et al. | 385/78 |
| 2009/0003777 | A1 * | 1/2009 | Feldner | 385/92 |
| 2010/0266242 | A1 * | 10/2010 | Lu et al. | 385/53 |

* cited by examiner

*Primary Examiner* — Mark Robinson
*Assistant Examiner* — Mary El Shammaa
(74) *Attorney, Agent, or Firm* — Justin Lampel

(57) ABSTRACT

A taper-locking ferrule for use with optical fibers is provided. The taper-locking ferrule has an interior channel. The interior channel is tapered from one end to the other end and has a threaded interior portion. In an embodiment, the threaded interior portion covers approximately half of the interior wall of the channel. A slit may extend along the threaded portion, from the exterior surface of the device to the interior channel, dividing the threaded portion of the interior channel into sections and allowing the interior channel to slightly expand. The threaded portion of the interior channel grasps and secures an optical fiber.

7 Claims, 10 Drawing Sheets

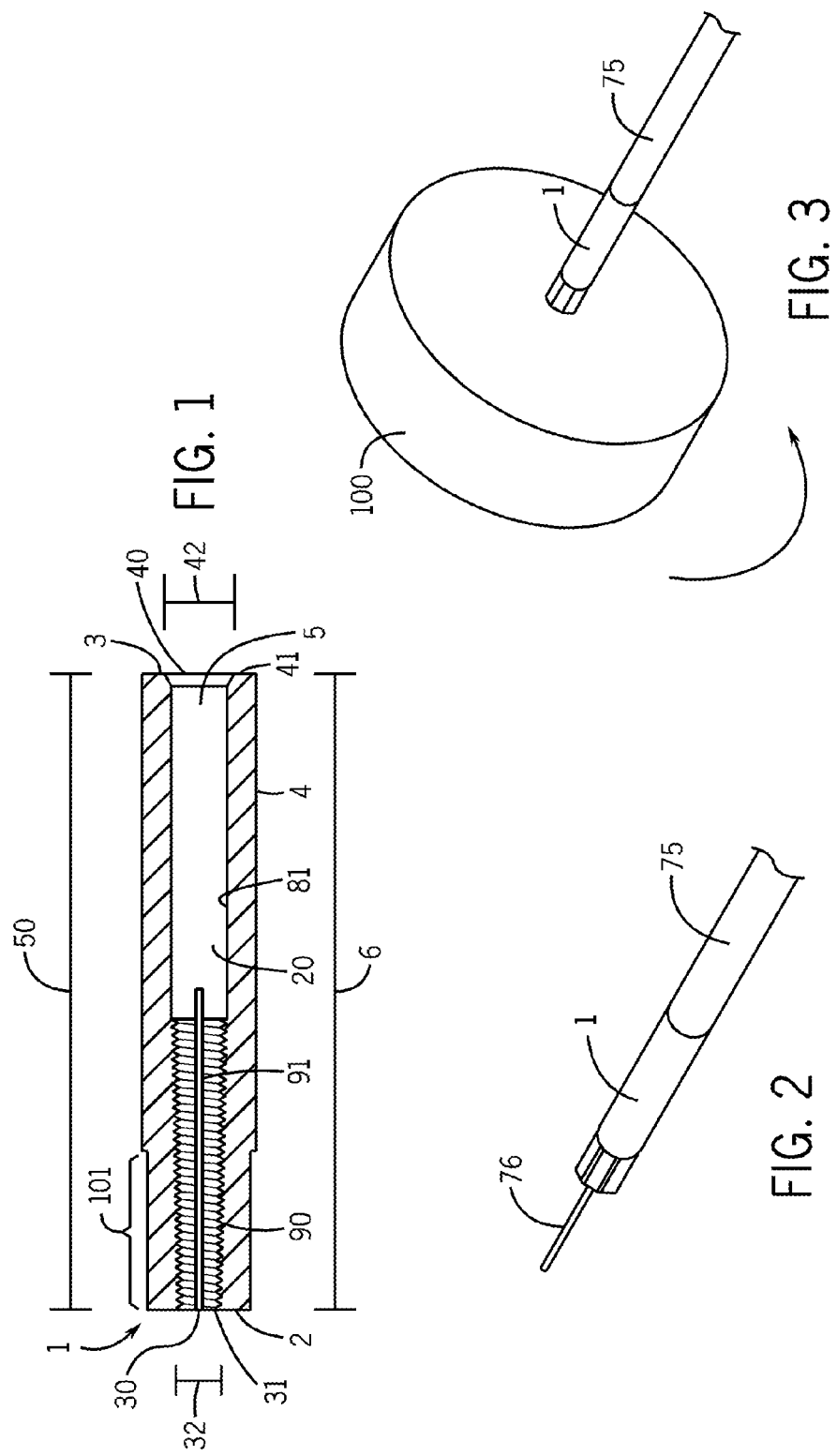

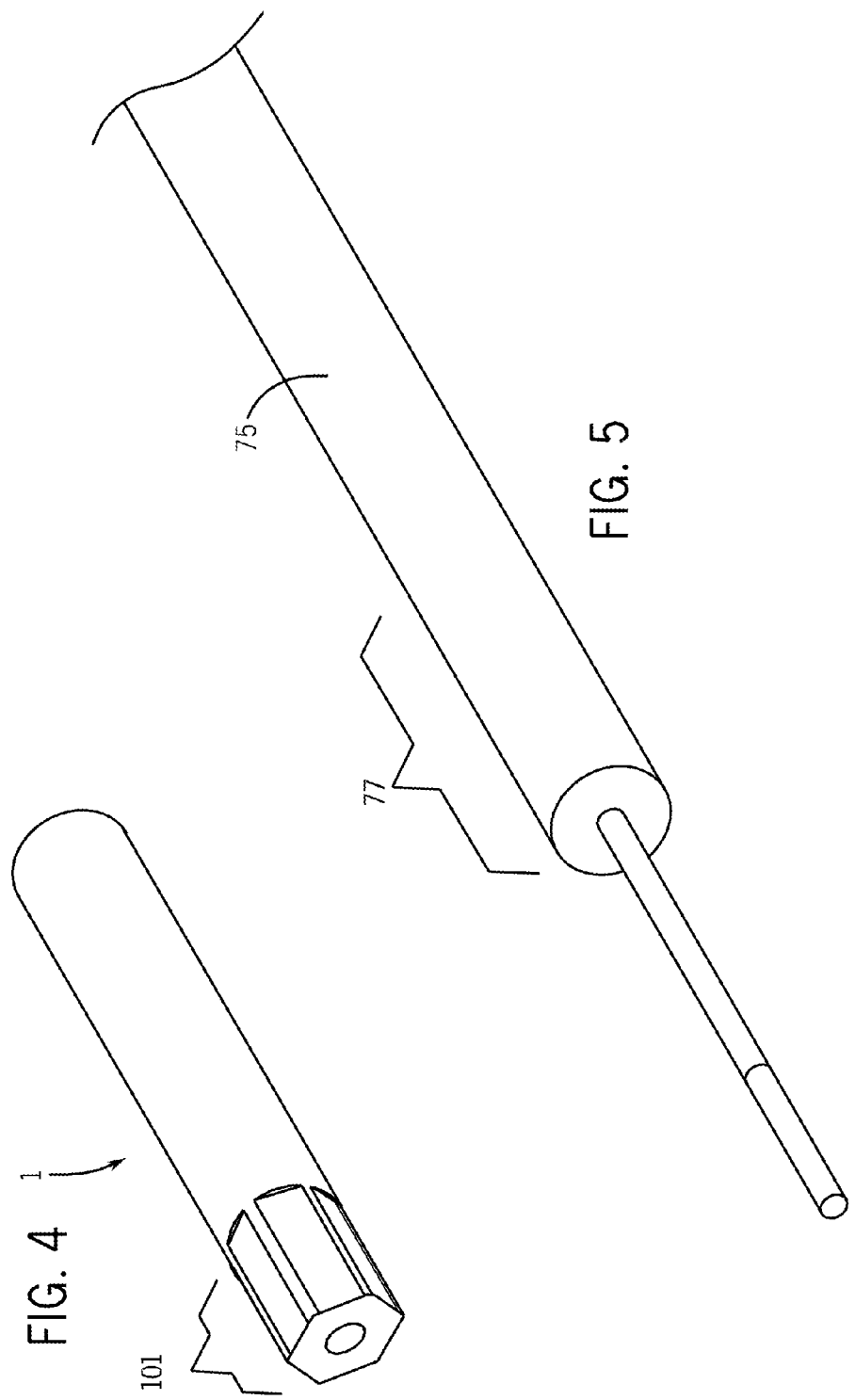

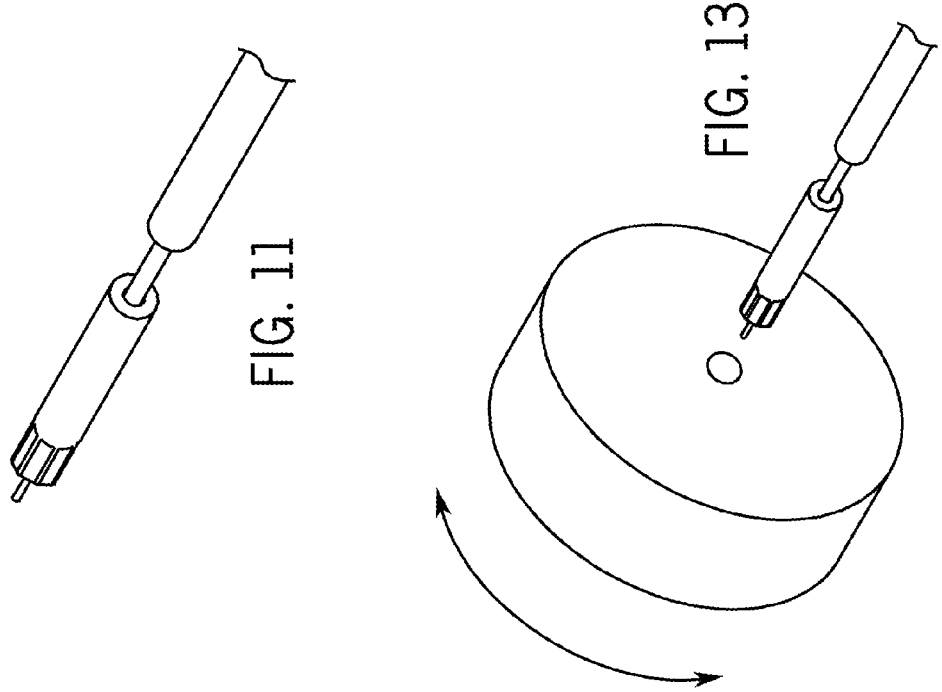
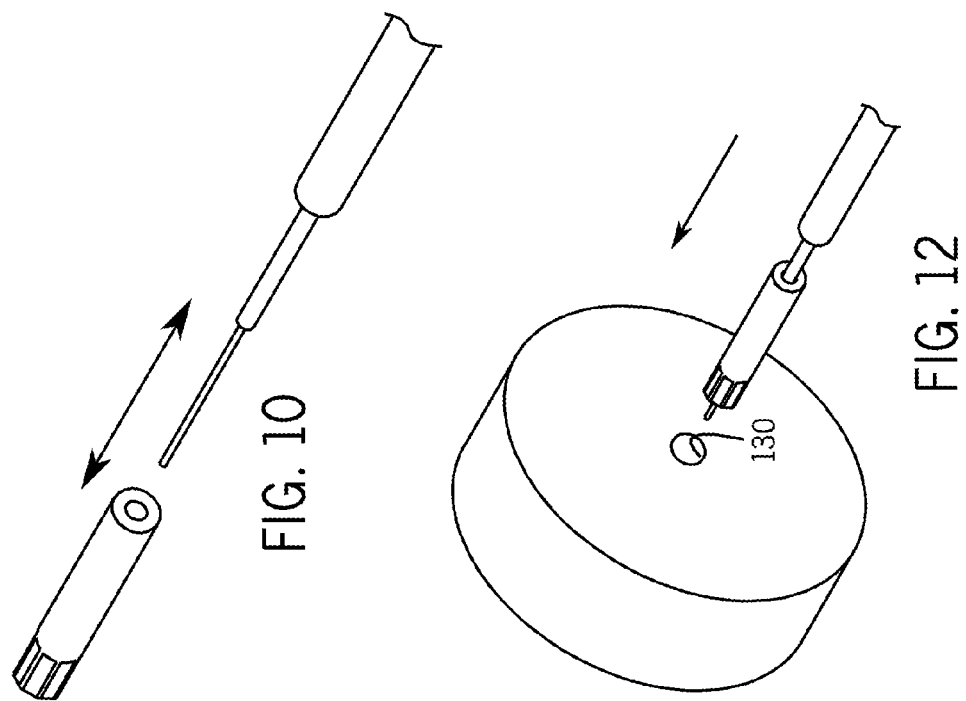

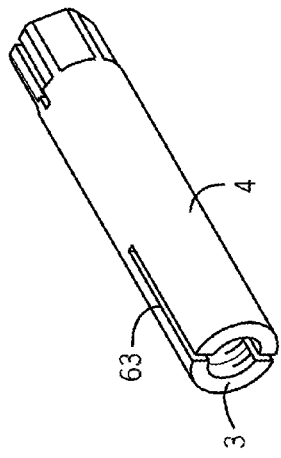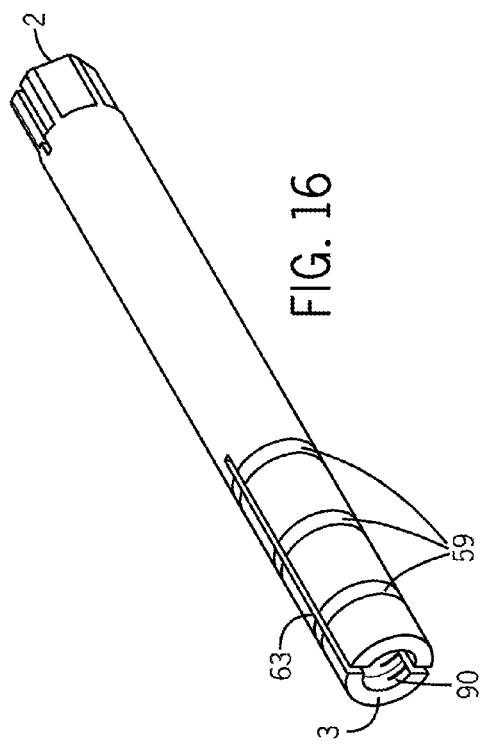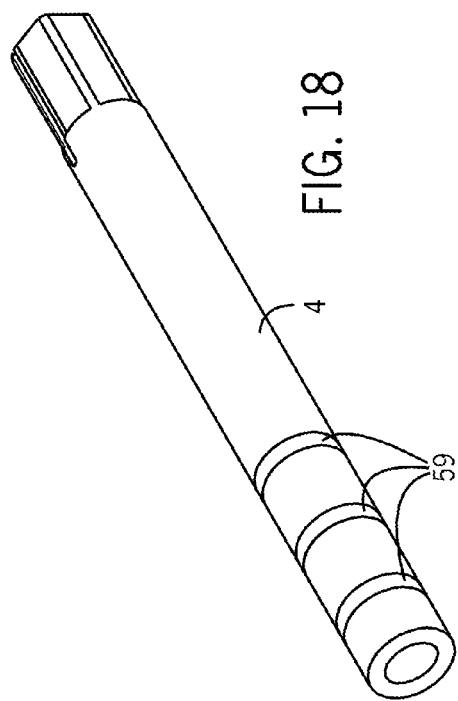

TAPER-LOCKING FERRULE

BACKGROUND OF THE INVENTION

A taper-locking ferrule for use with optical fibers is provided. The taper-locking ferrule has an interior channel The interior channel is tapered from one end to the other end and has a threaded interior portion. In an embodiment, the threaded interior portion covers approximately half of the interior wall of the channel. A slit may extend along the threaded portion, from the exterior surface of the device to the interior channel, dividing the threaded portion of the interior channel into sections and allowing the interior chamel to slightly expand. The threaded portion of the interior channel grasps and secures an optical fiber.

Optical fiber ferrules have been around since the early 1980s. An optical fiber ferrule is generally a plastic, ceramic or metal portion of a fiber-optic plug which secures the end of the optical fiber and precisely aligns the fiber optic to a socket. In previous ferrules, the optic fiber is inserted into the ferrule and secured with an adhesive, such as an epoxy. The adhesive is designed to give the optical fiber long-term mechanical strength and also help prevent contamination of the fiber optic from the surrounding elements. If the alignment of the ferrule is not exact, a poor connection will result and the quality of the signal is diminished.

Over the years many optical fiber ferrules have been developed. For example, U.S. Pat. No.: 7,845,859 to Roth et al discloses a ferrule assembly for terminating at least one fiber of a ribbon cable in a ferrule, where the ferrule assembly is positioned in a housing of an optical connector. The ferrule assembly includes the ferrule having a mating face, at least one groove for receiving the fiber and at least one through-hole. The ferrule assembly also includes an alignment member holder having at least one alignment member and providing a first channel for the ribbon cable, the alignment member being insertable in the through-hole of the ferrule and having a first length such that an end of the alignment member extends beyond the mating face of the ferrule when the ferrule assembly is assembled. The ferrule assembly further includes a carrier body attachable to the alignment member holder, the carrier body having at least two biasing member capture portions, each of the biasing member capture portions providing an opening for capturing a biasing member therein when the alignment member holder and the carrier body are attached. The carrier body further provides a second channel for the ribbon cable, the second channel being disposed between the biasing member capture portions of the carrier body and being contiguous with the first channel when the alignment member holder and the carrier body are attached.

Further, U.S. Pat. No.: 6,789,950 to Loder et al discloses a fiber optic connector system for connecting at least one optical fiber cable mounted near the edge of a planar substrate to a backplane, each optical fiber cable including a plurality of optical fibers and a terminating ferrule, the longitudinal orientation of the optical fibers within the terminating ferrule defining a longitudinal axis and a forward direction, the ferrule having a first longitudinal range of motion and a ferrule spring element having a longitudinal ferrule spring force. The optical connector system includes a substrate housing assembly and a backplane housing assembly. The substrate housing assembly is designed to be mounted on the planar substrate and includes at least one ferrule receiving cavity for receiving the optical fiber ferrule, and a substrate housing assembly spring. The substrate housing assembly has a longitudinal freedom of motion with respect to the substrate, the housing assembly spring controlling movement of the substrate housing assembly along the longitudinal axis and having a longitudinal spring force, wherein The backplane housing assembly defines at least one longitudinal receiving cavity, the receiving cavity having a frontal opening along the first surface of the backplane member and a rear opening along the second surface of the backplane member. A frontal door covers the frontal opening and a rear door covers the rear opening.

Telecommunication companies are always looking for ways to move information faster. Currently, telecommunication companies use a typical set-top box installation. Installers at these telecommunication companies either use a simple Ethernet RJ-45's with a pre terminated cable, or they use 1 mm plastic optic fiber ("POF") with connectionless transceivers with good results. The RJ-45 is a registered jack standard for a modular connector using 8 conductors, which specifies the physical male and female connectors as well as the pin assignments of the wires in a telephone cable. The disadvantage in using a 1 mm POF is that bandwidth is limited therein limiting the length of the cable that may be used.

In typical ferrules, a subscriber connector ("SC") is typically built around a long cylindrical 2.5 mm diameter ferrule, made of ceramic (zirconia) or metal (stainless alloy). A 124~127 um diameter high precision hole is then drilled in the center of the ferrule, where stripped bare fiber is inserted through and usually bonded by epoxy or adhesive. The end of the fiber is at the end of the ferrule, where it typically is polished smooth.

Almost all fiber-optic connectors have one thing in common which is the alignment of the ferrule to the fiber optic core. The ferrule is usually on the nose or the front of the connector and does the alignment of the fiber to the fiber-optic transceiver. The ferrule usually has very high concentric tolerances as this is a direct reflection on how well the fiber is aligned to the outside of the ferrule. Some of the new technologies in use now are connector-less transceiver like the Optolock® (like FIG. 21) which is manufactured by Firecomms in Ireland which uses the outside jacket and the alignment and holding feature of the fiber core. These types of transceivers work well on polymer optical fiber that has a very large core fiber and the alignment tolerances are not as accurate. However, with small core fiber optics these connectorless transceivers do not have the alignment capabilities to produce good results.

With modern manufacturing processes in the art of cable making over the last decade, the refinement of the concentricity tolerances between the buffer, the fiber core and or the jacket have become very exact.

However, existing methods fail to allow the easy installation of current fiber and hardware so that the large bandwidth can travel long distances accurately. A need, therefore, exists for an easy installation process which uses current off the self devices. Accordingly, the present taper ferrule is provided which will allow this larger bandwidth to travel longer distances without losing content.

SUMMARY OF THE INVENTION

A taper-locking ferrule for use with optical fibers is provided. The taper-locking ferrule has an interior channel. The interior channel is tapered from one end to the other end and has a threaded interior portion. In an embodiment, the threaded interior portion covers approximately half of the interior wall of the channel. A slit may extend along the threaded portion, from the exterior surface of the device to the interior channel, dividing the threaded portion of the interior channel into sections and allowing the interior channel to slightly expand. The threaded portion of the interior channel grasps and secures an optical fiber.

An advantage of the present taper ferrule is that the ferrule aligns the buffer to the outside of the ferrule so that the buffer and taper ferrule are extremely concentric.

Yet another advantage of the present taper ferrule is that the ferrule does the retention onto the buffer or jacket without the use of any adhesives or mechanical crimps or swaging.

Still another advantage of the present taper ferrule is that the ferrule may be combined with a number of components to make a fiber-optic connector.

And yet another advantage of the present taper ferrule is that the taper ferrule may work with Perflorinated graded index small core fiber optics.

Still another advantage of the present taper ferrule is that the taper ferrule may work with connector-less transceivers and produce the alignment capabilities to produce optimal results.

An advantage of the present taper ferrule is that the device may be used with plastic clad silica fiber optics (PCS or HCS®) hard clad silica registered trademark of the OFS corporation.

Another advantage of the present taper ferrule is that the device may be used with a polymer optic fiber and cable.

Yet another advantage of the present taper ferrule is that, in an embodiment, the device may have at least one external groove which helps in the threading of the buffer material.

And another advantage of the present taper ferrule is that the taper ferrule has a simple cylindrical shape.

Yet another advantage of the present taper ferrule is that the taper female may have a portion of the exterior surface which is hexagon or octagon in shape which may facilitate the installation of the taper ferrule via an installation tool.

And advantage of the present taper ferrule is that the taper ferrule has an internal channel which has a diameter greater on one end than the other so as to better grasp the buffer of the fiber optic cable.

An advantage of the present taper ferrule is that a user may easily terminate the assembly ferrule/fiber or connector without the need to polish the optical fiber.

For a more complete understanding of the above listed features and advantages of the taper-locking ferrule, reference should be made to the following detailed description of the preferred embodiments and to the accompanying drawings. Further, additional features and advantages of the invention are described in, and will be apparent from, the detailed description of the preferred embodiments and from the drawings.

BRIEF DESCRIPTION OF THE DRAWINGS

FIG. 1 illustrates is a cross section of an interior of the taper ferrule.

FIG. 2 illustrates a side perspective of the fiber optic cable wherein the taper ferrule is attached to the fiber optic cable.

FIG. 3 illustrates an installation tool being used to secure the taper ferrule to the fiber optic cable.

FIG. 4 illustrates a perspective view of the taper ferrule.

FIG. 5 illustrates a perspective view of the fiber optic cable without the taper ferrule secured to the same.

FIG. 10 illustrates the taper ferrule being inserted onto the buffer that has been stripped.

FIG. 11 illustrates the taper ferrule being secured on the fiber optic cable.

FIG. 12 illustrates the installation tool being inserted on the nose of the taper ferrule.

FIG. 13 illustrates an installation tool being used on the nose of the taper ferrule to secure the fiber optic cable.

FIG. 16 illustrates an embodiment of the second end of the taper ferrule wherein the second end has external grooves and wherein the second end of the taper has an internal threaded portion and a slot wherein the slot aids in cable retention when an outside force is applied to the taper.

FIG. 17 illustrates an embodiment of the second end of the taper ferrule wherein the second end has a slot and wherein the second end of the ferrule's interior has an internal threaded portion but lacks outside grooves.

FIG. 18 illustrates an embodiment of the second end of the taper ferrule wherein grooves are present but the I.D. lacks slots and lacks an internal threaded portion at the second end.

DETAILED DESCRIPTION OF THE PREFERRED EMBODIMENTS

A taper-locking ferrule for use with optical fibers is provided. The taper-locking ferrule has an interior channel The interior channel is tapered from one end to the other end and has a threaded interior portion. In an embodiment, the threaded interior portion covers approximately half of the interior wall of the channel A slit may extend along the threaded portion, from the exterior surface of the device to the interior channel, dividing the threaded portion of the interior channel into sections and allowing the interior channel to slightly expand which aids in the installation. The threaded portion of the interior channel grasps and secures an optical fiber.

Figure 21:
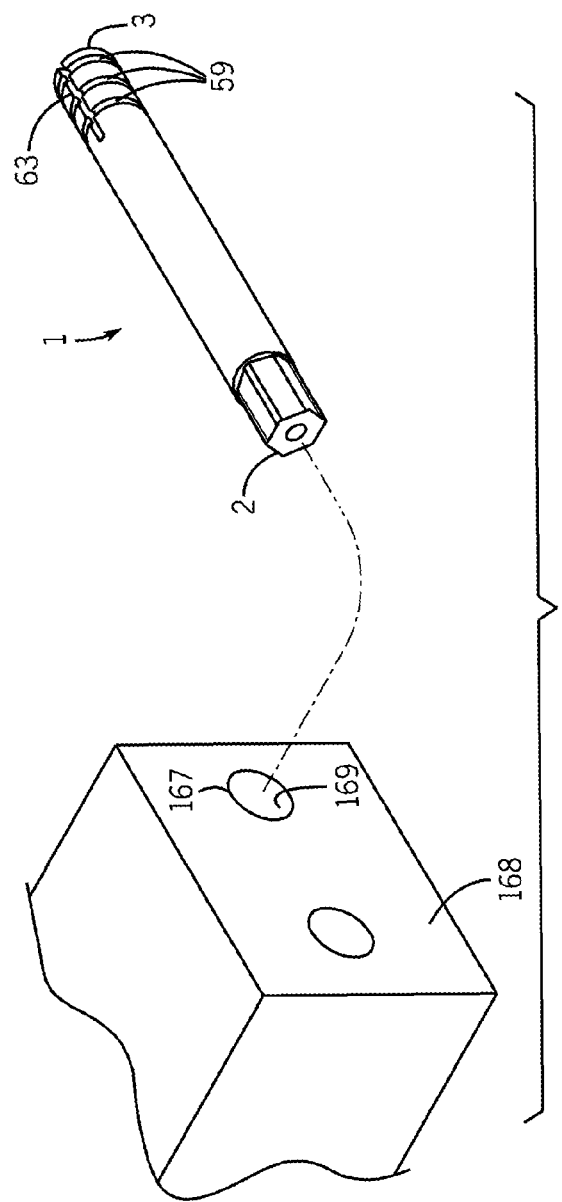
FIG. 21 illustrates the taper ferrule being inserted into a cable connector/housing.

Referring now to FIG. 1, a novel taper ferrule 1 is provided. The taper ferrule 1 may be combined with a number of components to make a fiber-optic connection, connector, or it may be used by itself for connector-less type transceivers or other devices (FIG. 21). The taper ferrule 1 has a first end 2, a second end 3, an exterior surface 4, an interior 5 and a length 6. The taper ferrule 1 is generally made from plastic or metal; although various other materials may be used depending on the desired use of the taper ferrule 1.

The interior 5 of the taper ferrule 1 has a channel 20 which runs largely (but not entirely) parallel with respect to the exterior surface 4. More specifically, the channel 20 runs from the first end 2 to the second end 3 such that an optical fiber 76 (FIG. 2) may be inserted all the way through the channel 20 and may pass from the second end 3 of the taper ferrule 1 to the first end 2. The optical fiber 76 may be largely covered by a fiber optic protective covering (also called an "outer jacket") 75. Together, the optical fiber 76 and fiber optic protective covering 75 form the fiber optic cable 77. In an embodiment, a buffer 125 (FIG. 8) surrounds the optical fiber 76 wherein the buffer 125 is located between the optical fiber 76 and the fiber optic protective covering 75. The buffer 125 provides increased protection for the optical fiber 76.

The channel 20 may have a first end 30, a second end 40 and a length 50. The length 50 of the channel 20 is identical to the length 6 of the taper ferrule 1. The first end 30 of the channel 20 may be located at the first end 2 of the taper ferrule 1 whereas the second end 40 of the channel 20 may be located at the second end 3 of the taper ferrule 1. The first end 30 of the channel 20 may have an opening 31 having a diameter 32. The second end 40 of the channel 20 may have an opening 41 having a diameter 42. The opening 31 at the first end 30 and the opening 41 at the second end 40 may be generally circular in shape. The diameter 32 at the opening 31 at the first end 30 of the channel 20 is less than the diameter 42 at the opening 41 at the second end 40 of the channel 20. In an embodiment, the angle increase along the channel 20 may vary depending on the makeup of the cable (durometer). Further, it should be understood that the exact angle used may vary a good deal depending on the length of the taper ferrule 1, the type and size of the fiber optic cable 77 or other considerations without departing from the spirit of the present taper ferrule 1.

It should be understood that in an embodiment, the interior 5 of the ferrule has a channel 20 which runs exactly parallel with respect to the exterior surface 4. In this embodiment, the channel 20 is not tapered.

The channel 20 of the taper ferrule 1 may have an interior wall portion 81 which receives a portion of the fiber optic cable 77. More specifically, in an embodiment, the channel 20 of the taper ferrule 1 may receive the optical fiber 76 and/or the buffer 125 whereas the protective covering 75 remains outside of the channel 20 of the taper ferrule 1. As stated above, the interior wall 81 of the channel 20 may be slightly tapered so that the opening 31 on the first end 2 is less than the opening 41 on the second end 3 of the channel 20. The tapered channel 20 may help align the optical fiber 76 to the connection point 167 (FIG. 21) of a connector 168 so that the connection of the optical fiber 76 to the connection point 167 is extremely concentric and the signal may be passed much faster and more accurately.

Figure 6:
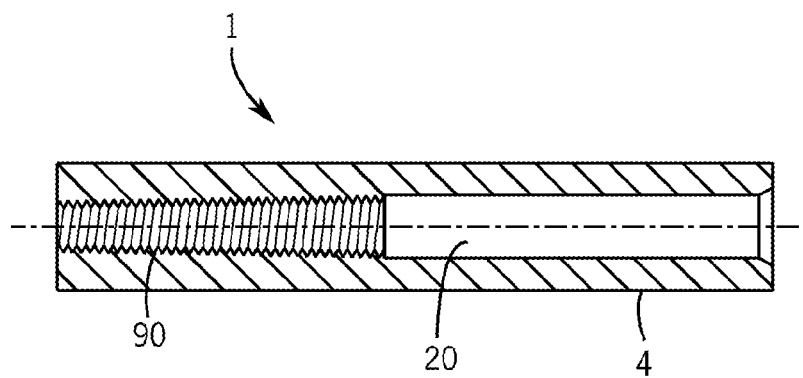
FIG. 6 illustrates an interior view of the taper ferrule.
Figure 7:
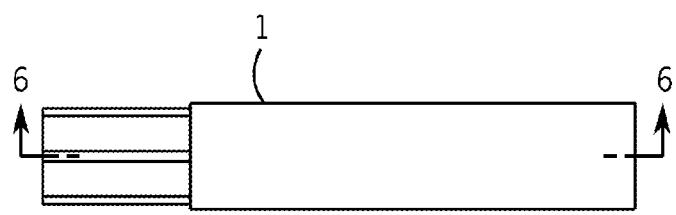
FIG. 7 illustrates a side view of the taper ferrule.
Figure 14:
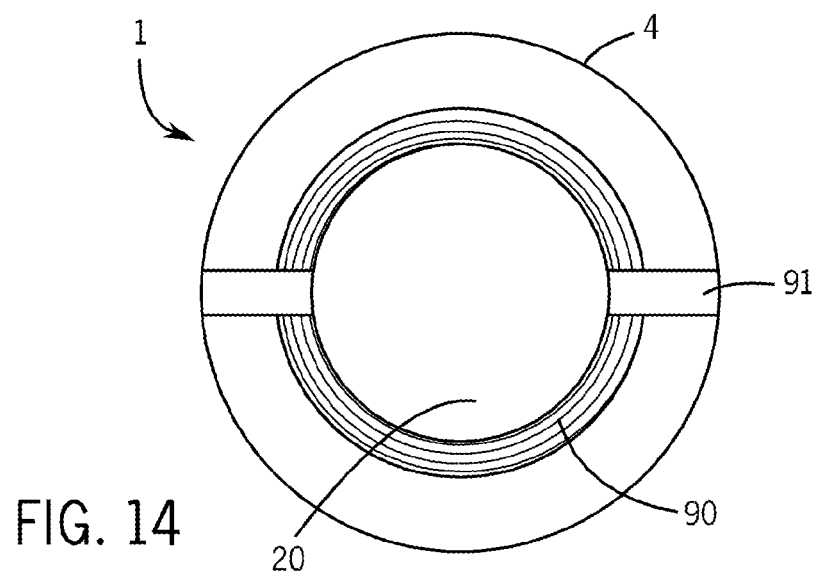
FIG. 14 illustrates a front view of the taper ferrule.
Figure 8:
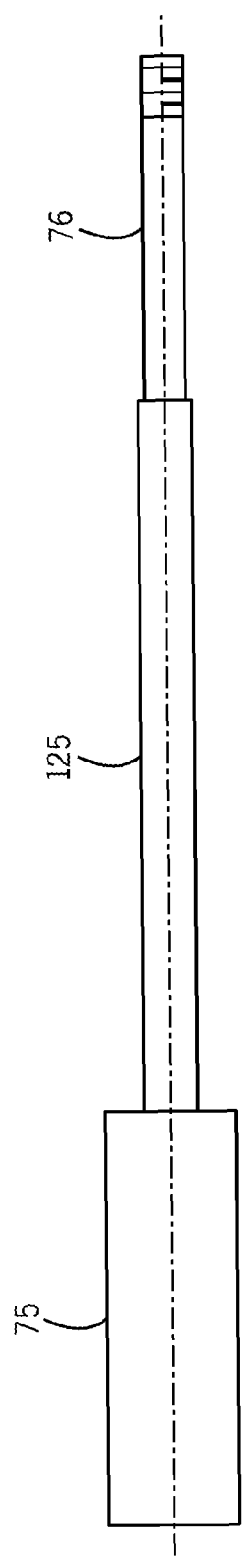
FIG. 8 illustrates a side view of the fiber optic cable with the outer jacket secured to the same wherein the buffer has a threaded member which is created by the taper lock ferrule.
Figure 9:
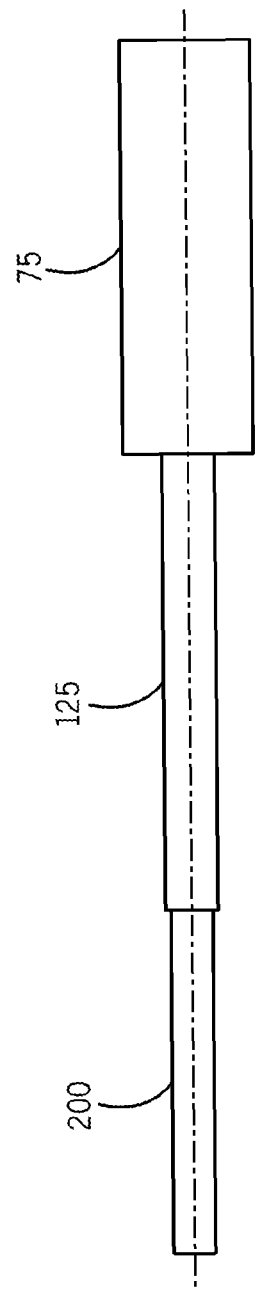
FIG. 9 illustrates a side view of the fiber optic cable with the outer jacket secured to the same.

The interior walls 81 of the channel 20 of the taper ferrule 1 may have a spiral or helix threaded portion 90 which grasps and secures the optical fiber 76 and/or the buffer 125 of the fiber optic cable 77, but not the protective covering 75 (which remains outside the taper 1). The spiral or helix threaded portion 90 may only occupy a portion of the length 50 of the channel 20 of the taper ferrule 1. In an embodiment, the portion of the interior walls 81 that the spiral or threaded portion 90 occupies is approximately half of the length 50 of the channel 20, as in FIG. 1. Referring now to FIG. 8, in an embodiment, the threaded portion 90 of the interior walls 81 may cause the optical fiber 76 to become partially threaded.

In an embodiment, a portion 101 of the exterior surface 4 of the first end 2 of the taper ferrule 1 may not be cylindrical. More specifically, the exterior surface 4 of the first end 2 of the taper ferrule 1 may have, for example, a hexagon or octagon exterior shape. The hexagon or octagon shape may allow the taper ferrule 1 to be easily secured onto the optical fiber 76 (or buffer 125 as described below) by use of an installation device 100 (FIG. 3).

Figure 15A:
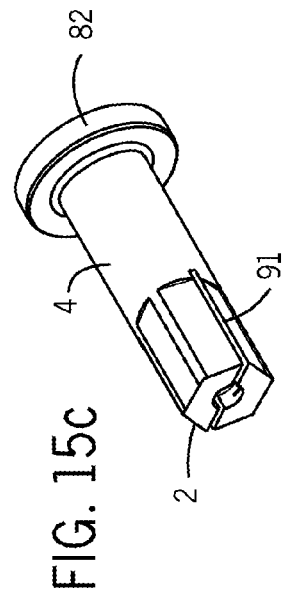
FIGS. 15a-d illustrate embodiments of the first end (the nose) of the taper ferrule wherein the taper ferrule has slots to help secure the device to a fiber optic cable.
Figure 15C:
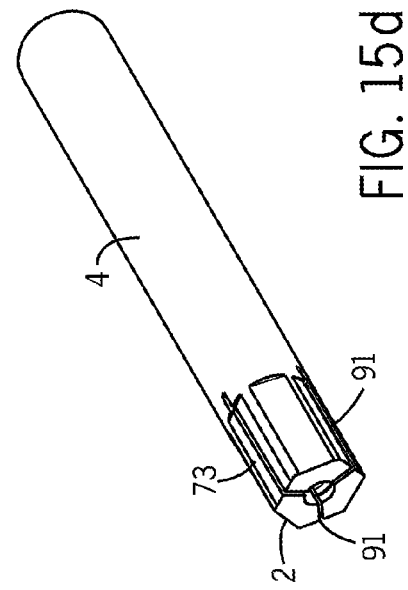
Figure 15B:
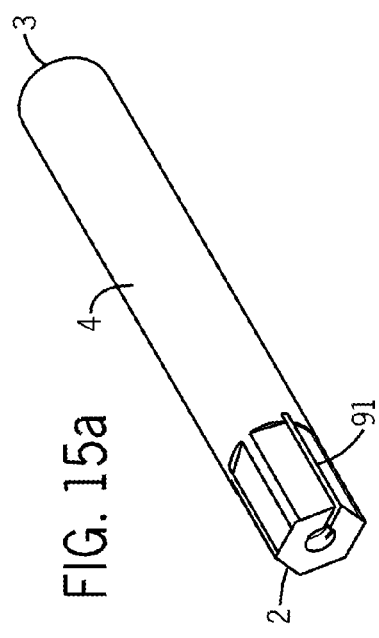
Figure 15D:
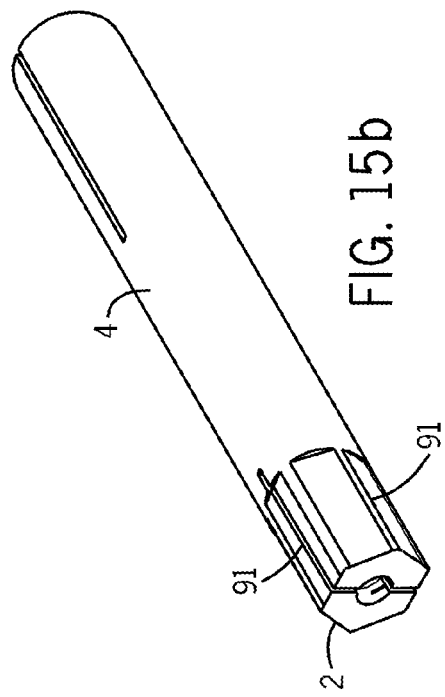

Referring now to FIGS. 15*a*-*d*, in an embodiment, the first end 2 (or nose) of the taper ferrule 1 may be have a slit 91 (FIG. 15*a*) or plurality of slits 91 (FIGS. 15*b*-15*d*) on the exterior surface 4. The slits 91 may aid the threading process for different jacket materials and durometer and may help in retention of the taper 1 to the connection point 167 of the connector 168 and may further aid in the alignment of the taper ferrule 1 with the optical fiber 76. As illustrated in FIG. 15*c*, a shoulder 82 may be present at the second end 3 of the taper ferrule 1. The shoulder 82 at the second end 3 of the taper ferrule 1 may encapsulate and hold the taper ferrule 1 in the correct position with respect to a connection point 167 so that the taper ferrule 1 still has the ability to be rotated or threaded onto the optical fiber 76. In the embodiments with the slit(s) 91 on the exterior surface 4 of the first end 2 of the taper ferrule 1, the slit(s) 91 may be equally spaced apart. For example, in an embodiment with two slits 91 (FIGS. 15*b* and 15*c*), the slits 91 should be generally one hundred and eighty degrees apart on the exterior surface 4. In an embodiment with three slits 91 (FIG. 15*d*), each slit 91 would be approximately one hundred and twenty degrees apart.

In the embodiments with the slit(s) 91 on the exterior surface 4 at the first end 2, the slit(s) 91 may run substantially parallel with respect to one another. Further, the slit(s) 91 run substantially parallel with respect to the body of the taper ferrule 1. The slit(s) 91 may further extend from the exterior surface 4 through the walls of the taper ferrule 1 to the inner walls 81 of the channel 20 so that the first end 2 of the taper ferrule 1 may slightly compress or expand in diameter so as to better grasp the optical fiber 76.

Depending on the stiffness or durometer of the buffer 125, more or less slit(s) 91 may be needed. More specifically, the stiffer the buffer 125 the more slit(s) 91 should be implemented on the device 1.

In an embodiment, the slit(s) 91 extend from the exterior surface 4 of the device 1 all the way through to the internal channel 20 and may run substantially parallel with respect to the channel 20. The slit(s) 91 may allow the spiral or threaded portion 90 to slightly expand or contract to greater grasp the optical fiber 76 (or buffer 125) inserted within the interior 5 of the taper ferrule 1. The slight expansion of the threaded portion 90 at the slit 91 by the optical fiber 76 or the buffer 125 may allow the taper 1 to be more securely attached to the optical fiber 76 (or buffer 125) by, for example, friction.

To install the present taper ferrule 1 onto a fiber optic cable 77, some of the fiber optic protective covering (or "outer jacket") 75 of the existing fiber optic cable 77 is first removed. The fiber optic protecting covering 75 is typically removed by a stripping tool (not shown). Once some of the fiber optic protective covering 75 is removed from an end 200 of the fiber optic cable 77, in an embodiment, the user may then be required to remove a buffer 125. In some cases, the user may need to remove multiple layers of buffers 125 from the fiber optic fiber 76. The optical fiber 76 is then exposed.

To install the taper ferrule 1 on the fiber optic cable 77, the user first slides the opening 41 at the second end 3 of the taper ferrule 1 over the exposed optical fiber 76. As the optical fiber 76 and a portion of the buffer 125 move from the second end 3 of the taper ferrule 1 to the first end 2 of the taper ferrule 1 through the channel 20, the optical fiber 76 and a portion of the buffer 125 begin to contact the inner walls 81 of the channel 20. As a result of the channel 20 being tapered, the optical fiber 76 and a portion of the buffer 125 do not initially touch the inner walls 81 of the channel 20 until the optical fiber 76 and a portion of the buffer 125 approximately reach the spiral or threaded portion 90 of the channel 20 or until the optical fiber 76 and/or a portion of the buffer 125 reach a portion of the inner channel 20 which has a substantially similar diameter as the optical fiber 76 or buffer 125.

Once at least a portion of the optical fiber 76 first contacts the threaded portion 90 of the channel 20 and then exits the opening 31 at the first end 2 of the channel 20 (and exits the taper ferrule 1 as well), the user may secure the taper ferrule 1 onto the fiber optic cable 77. To accomplish this, the user inserts the installation device 100 over the end of the optical fiber 76 and taper ferrule 1. The installation device 100 may have an interior opening 130 which correspondingly matches in shape with a portion 101 of the exterior 4 surface at the first end 2 of the taper ferrule 1. For example, if the exterior 4 surface of the first end 2 of the taper ferrule 1 is a hexagon shape, then the interior opening 130 of the installation tool 100 is also a hexagon. The user may then twist the installation tool 1 in a clockwise or counterclockwise manner to secure the taper ferrule 1 onto the optic fiber cable 77 by means of, for example, friction. Holding the taper ferrule 1 onto the fiber optic cable 77 by friction also allows the user to eliminate the use of mechanical crimps, swagging or adhesives. It should be understood that although not required, an adhesive, clamp or swage may be used in addition to friction to secure the taper ferrule 1 to the fiber optic cable 77.

As the installation device 100 is twisted, the spiral or threaded portion 90 of the channel 20 is twisted and grasps the buffer 125 of the fiber optic cable 77. During the twisting, the slit(s) 91 of the spiral or threaded portion 90 may slightly expand (forcing the sections of the spiral or threaded portion 90 slightly apart). The slight expansion of the spiral or threaded portion 90 creates a further friction holding the taper ferrule 1 onto the fiber optic cable 77. Although the exact amount may vary, the installation tool 100 may be rotated approximately three full rotations to firmly secure the taper ferrule 1 onto the fiber optic cable 77. As the taper ferrule 1 is rotated around the fiber optic cable 77, the threaded portion 90 of the taper ferrule 1 partially digs into the fiber optic cable 77 and attaches to the fiber optic cable 77 without the need for an adhesive or other securing mechanism.

Once the taper ferrule 1 is secured on the fiber optic cable 77, the optical fiber 76 may be terminated. For best results, a polish, diamond finishing method or a simple razor cutter may be used for optimal result.

Referring now to FIGS. 16 and 18, in an embodiment, the present taper ferrule 1 may have an external groove(s) 59. The external grooves 59 of the taper ferrule 1 may run substantially parallel with respect to one another and substantially perpendicular with respect to the main body of the taper ferrule 1. Further, the external grooves 59 may encircle the external 4 surface of the taper ferrule 1 near the second end 3 of the taper ferrule 1. More specifically, the grooves 59 may be located near the end of the taper ferrule 1 which makes contact with the protective covering (or "jacket") 75 of the fiber optic cable 77.

The external grooves 59 may allow the taper ferrule 1 to be secured to a connector 168 (FIG. 21) when used in a connector-less holding device. FIG. 16 illustrates the second end 3 of the taper ferrule 1 having external grooves 59 and a spiral or helix threaded portion 90 within the internal channel 20. FIG. 17 illustrates the taper ferrule 1 lacking external grooves 59 on the second end 3 but having the spiral or helix threaded portion 90 in the internal channel 20 of the device 1. FIG. 18 illustrates the taper ferrule 1 having external grooves 59 but no internal threaded member within the internal channel 20.

Figure 19:
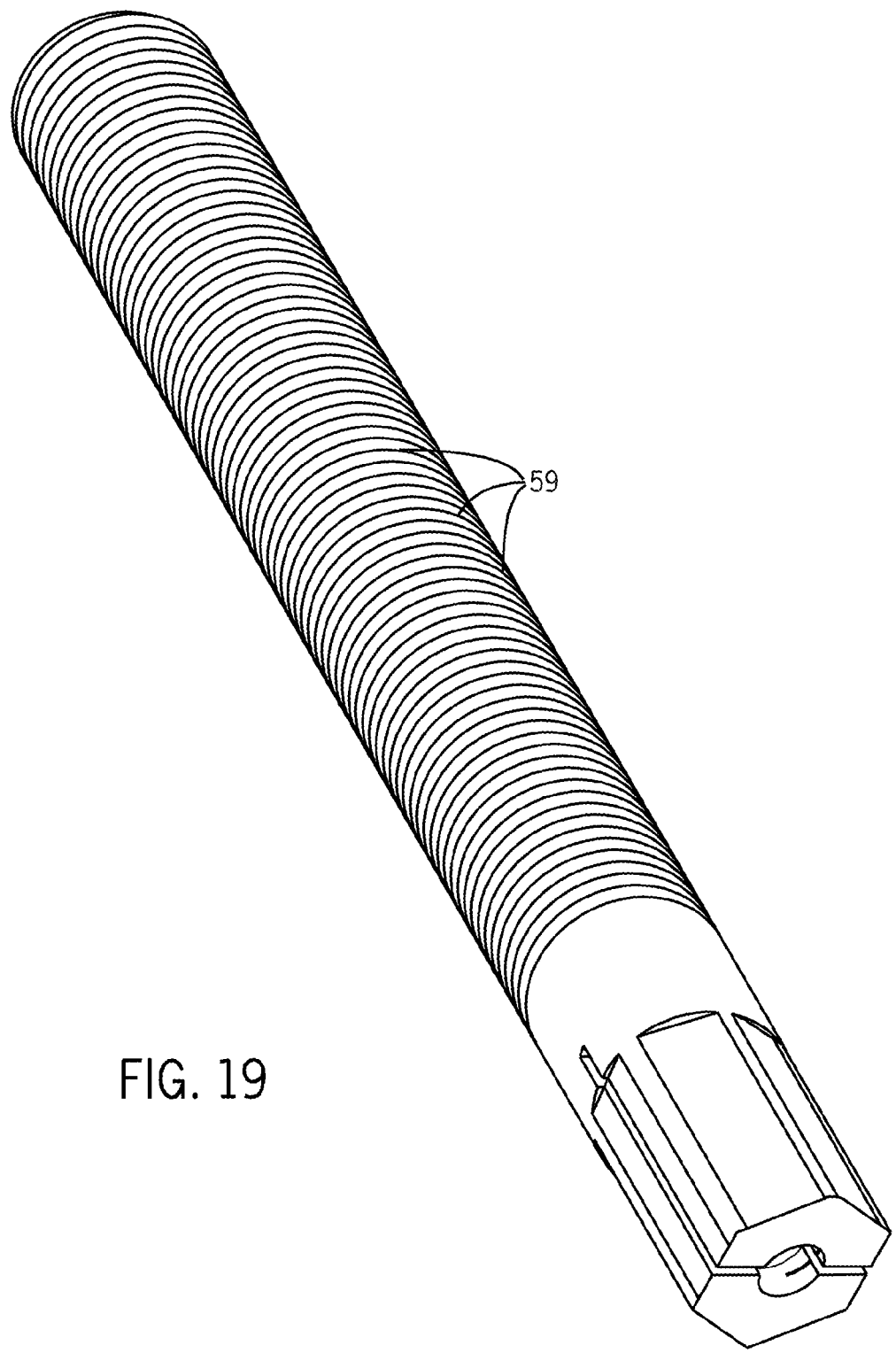
FIG. 19 illustrates a perspective view of the taper ferrule wherein substantially the entire exterior surface of the taper ferrule has external grooves (or threads).

Referring now to FIG. 19, in an embodiment, substantially all of the exterior surface 4 of taper ferrule 1 may have external grooves 59. As a result of substantially all of the exterior surface 4 of the taper ferrule 1 having external grooves 59, the taper ferrule 1 may be easily secured to the connection point 167 of the connector 168.

In an embodiment, the second end 3 of the taper ferrule 1 may have an external slot 63 similar to the slits 91 (FIGS. 15a-15d) of the first end 2 of the taper ferrule 1. The slot 63 at the second end 3 of the taper ferrule 1 may a have similar function to the slit(s) 91 at the first end 2 of the taper ferrule 1. More specifically, the external slot 63 at the second end 3 of the taper ferrule 1 may allow the interior wall portion 81 of the device 1 to slightly expand or contract therein allowing the interior wall portion 81 to better grasp the optical fiber 76 or buffer 125 when the optical fiber 76 or buffer 125 is introduced into the interior 5 of the taper ferrule 1.

Figure 20:
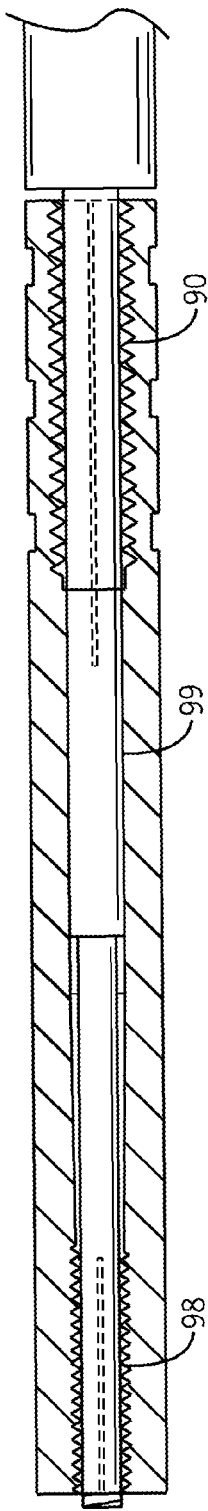
FIG. 20 illustrates a cross section view of the taper ferrule wherein each end of the ferrule I.D. has a grasping threaded helix portion.

Referring now to FIG. 20, in an embodiment, the interior wall portion 81 of the device 1 may have a threaded portion 90 on the first end 2 and a second threaded portion 98 on the second end 3 wherein the first threaded portion 90 and second threaded portion 98 are separated by a non-threaded portion 99 and wherein the first threaded portion 90 and second threaded portion 98 have different size threaded members. More specifically, the threaded portion 90 at the first end 2 may be larger than the threaded portion 98 at the second end 3 of the device 1 so as to allow the device 1 to properly grasp and secure different sized fibers.

Referring now to FIG. 21, in an embodiment the device 1 may be inserted into a connector housing 168. The connector housing 168 may have a connection point 167 which is similar in size and shape to the first end 2 of the taper ferrule 1. The external grooves 59 of the taper ferrule 1 may snap into an interior ridge 401 (FIG. 22) located on an interior channel wall 169 of the connection point 167 of the connector housing 168. As a result, the device 1 may be secured within the connection point 167 by, for example, friction. Further, having the plurality of grooves 59 at different location (FIG. 21 illustrates three grooves 59) may allow the installer to select which groove 59 will interact with the interior ridge 401 so as to best secure the device 1 in the connector 168.

Figure 22:
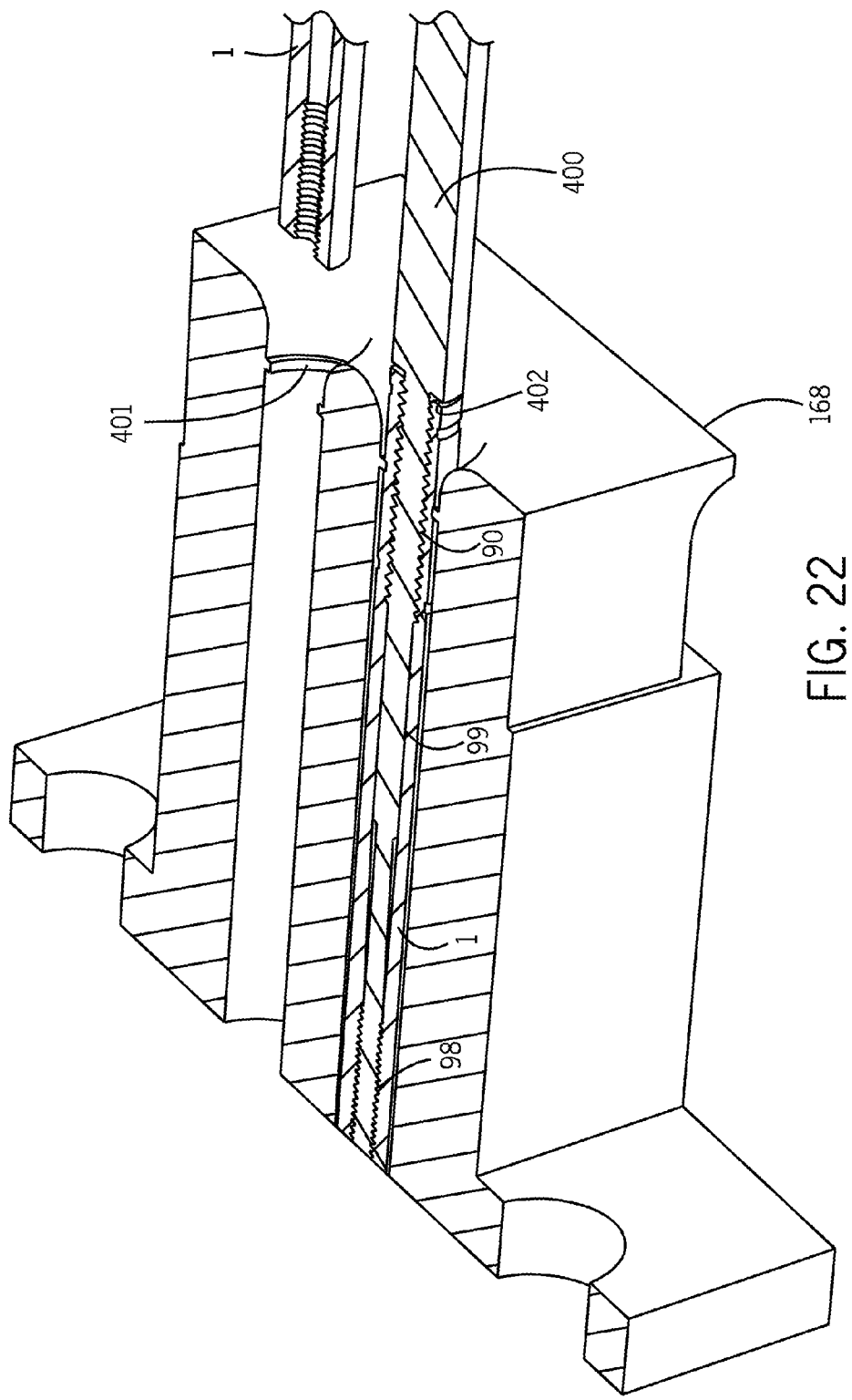
FIG. 22 illustrates a cut away view of the connector having two openings wherein a cable is inserted into one of the two openings.

Referring now to FIG. 22, as stated above, the connection point 167 of the connector housing 168 may have an internal ridge 401 for receiving and temporarily securing a groove 59 of the device 1. A shoulder 402 may be present where the taper ferrule 1 meets a cable 400. In an embodiment, the cable 400 may be identical to the above-described fiber optic protective covering 75 or the cable 400 may be an alternative cable to be inserted into the connector housing 168.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. An optical fiber connector comprising:
a generally cylindrical housing having a first end, a second end, an exterior surface and a generally cylindrical interior hollow channel;
an opening at the first end of the generally cylindrical housing wherein the opening at the first end has a diameter and an opening at the second end of the generally cylindrical housing wherein the opening at the second end has a diameter wherein the diameter of the opening at the first end is smaller than the diameter at the opening at the second end and wherein the generally cylindrical interior hollow channel is tapered from the second end to the first end and wherein the generally cylindrical interior hollow channel receives a naked optical fiber or an optical fiber covered in a protective coating and directly contacts the naked optical fiber or the protective coating of the optical fiber; and a threaded portion located within the generally cylindrical interior hollow channel wherein the threaded portion directly grasps and secures the naked optical fiber or the protective coating of the optical fiber.

2. The optical fiber connector of claim 1 further comprising:

a plurality of generally flat surfaces located at the first end of the exterior surface of the generally cylindrical housing wherein the plurality of generally flat surfaces surrounds a portion of the exterior surface of the generally cylindrical housing and wherein the remainder of the exterior surface of the generally cylindrical housing remains cylindrical.

3. The optical fiber connector of claim 1 further comprising:

a slit located on the first end wherein the slit extends from the exterior surface of the generally cylindrical housing down through to the generally cylindrical interior hollow channel and wherein the slit allows the generally cylindrical interior hollow channel to slightly expand or contract.

4. The optical fiber connector of claim 1 further comprising:

a plurality of grooves located on the second end of the exterior surface of the generally cylindrical housing wherein the plurality of grooves mates with a ridge located within an interior channel of a connector housing.

5. The optical fiber connector of claim 1 further comprising:

a second threaded portion in the generally cylindrical interior hollow channel of the generally cylindrical housing wherein the second threaded portion has different sized threads then a first threaded portion of the generally cylindrical interior hollow channel.

6. The optical fiber connector of claim 5 wherein the first threaded portion and the second threaded portion are separated by a generally smooth portion of the generally cylindrical interior hollow channel.

7. The optical fiber connector of claim 1 wherein the optical fiber passes completely through the generally cylindrical interior hollow channel.

* * * * *